Dec. 12, 1961   R. FEINBERG ET AL   3,012,472
EYE TESTING APPARATUS

Filed Feb. 26, 1959   4 Sheets-Sheet 1

INVENTORS
RICHARD FEINBERG
REUEL A. SHERMAN

BY Cushman, Darby & Cushman
ATTORNEYS

Dec. 12, 1961    R. FEINBERG ET AL    3,012,472
EYE TESTING APPARATUS
Filed Feb. 26, 1959    4 Sheets-Sheet 3

INVENTORS
RICHARD FEINBERG
REUEL A. SHERMAN

BY Cushman, Darby & Cushman
ATTORNEYS

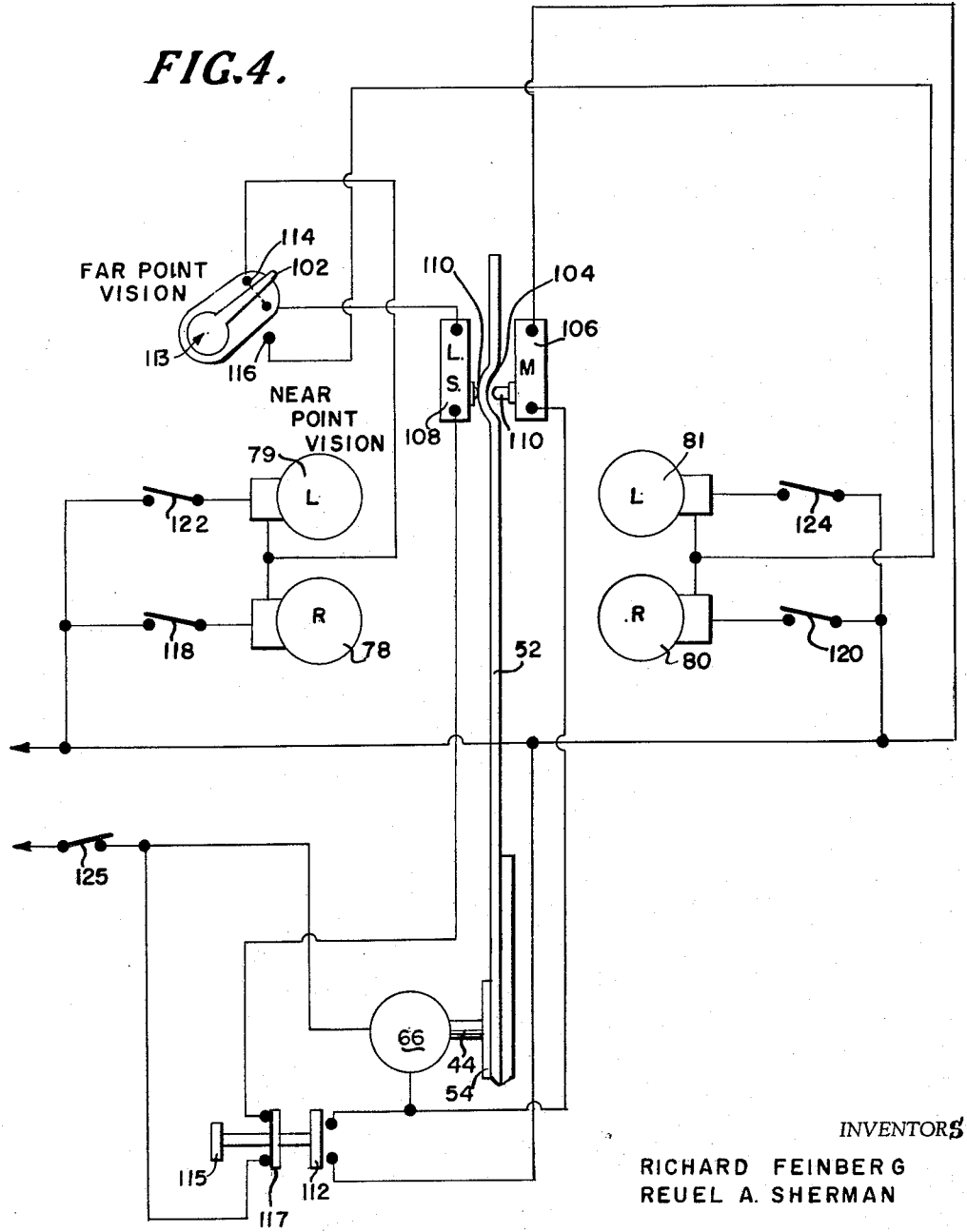

United States Patent Office 3,012,472
Patented Dec. 12, 1961

3,012,472
EYE TESTING APPARATUS
Richard Feinberg and Reuel A. Sherman, Petersburg, Va., assignors to Titmus Optical Company, Inc., Petersburg, Va., a corporation of Virginia
Filed Feb. 26, 1959, Ser. No. 795,873
4 Claims. (Cl. 88—20)

The present invention generally relates to ophthalmic instruments and, more particularly, has reference to eye testing apparatus. This disclosure is a continuation-in-part of a copending application, Serial No. 689,149, now abandoned, filed by the same inventors on October 9, 1957.

In general, therefore, it is the primary object of this invention to provide an improved eye testing apparatus for carrying out visual classification tests under standardized test conditions.

An important object of the present invention resides in the provision of a stereoscopic eye testing apparatus having a single rotatably mounted drum on which are detachably carried different types of target slides employed to separately test far point and near point visual characteristics.

A still further object of the present invention is to provide optical means for defining an angulated viewing path to substantially increase the visual distance between the viewing means and the far vision test objects.

Another important object of the present invention is to provide means for successively moving different test objects through related test stations for testing either far point or near point visual characteristics.

An additional object of the present invention resides in the provision of means for automatically interrupting the illumination of the test objects when they are being moved into testing position.

A still further object of the present invention is to provide an improved eye testing apparatus of this character which is extremely simple in construction, thoroughly reliable and effective in its purpose, possessing but few parts, completely automatic, relatively inexpensive to manufacture, readily lends itself to facile operation, and otherwise well adapted for the purposes for which the same is intended.

These and other objects and the entire scope of the present invention will become apparent from the detailed description given hereinafter. It should be understood, however, that the detailed description and specific examples, while indicating the preferred embodiments of the invention, are given by way of illustration only, since various changes and modifications within the spirit and scope of the invention will become apparent as the description herein progresses.

Reference is made to the accompanying drawings wherein like reference numerals refer to similar parts through the several views and wherein:

FIGURE 4 is a schematic diagram of the electrical control circuit utilized in the present invention.

Figure 1:
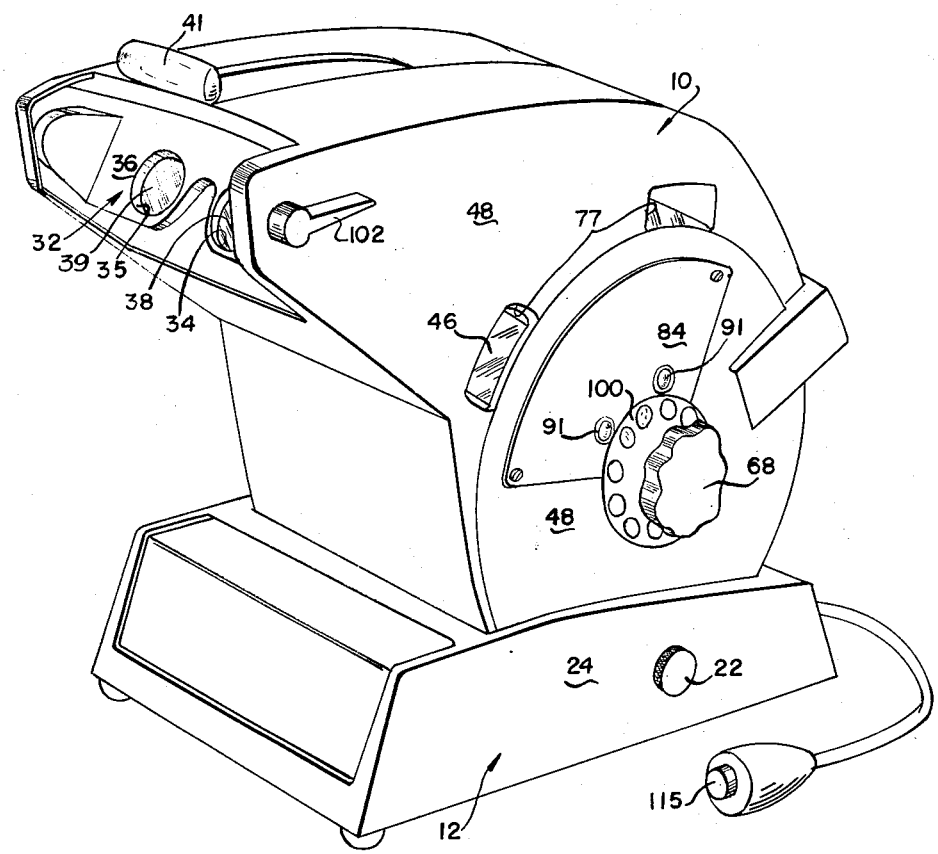
FIGURE 1 is a perspective view of an eye testing apparatus embodying the novel features of the present invention.

Referring now to the accompanying drawings in detail, where, for purposes of illustration, there is described a preferred embodiment of the present invention, the numeral 10 represents a light-occluding casing rotatably mounted in a base member 12. The casing 10 may be adjustably elevated or depressed with respect to the base member 12 so that the device may be suitably positioned before the eyes of a person undergoing test. The casing 10 rests upon a set of guide rollers 14 which are carried by an axle 15 rotatably mounted in the base member 12. The rollers 14 are arranged to register with a guideway 16 formed in the rounded lower portion 18 of the casing 10. Means for balancing the casing 10 in adjusted positions of elevation is provided by employing a tension spring 20 which is shown having one end secured to the base member 12 and the other end secured to the lower portion 18 of the casing 10 for resiliently urging the casing 10 in a clockwise direction. A tension control knob 22 is connected to a shaft 23 which passes through the side wall 24 of the base member 12 and a slot 26 formed in a side wall 48 of the casing 10. A lug 28 is threadedly secured to shaft 23 for frictionally controlling the rotary movement of the casing 10 in relation to the base member 12. Accordingly, tension on the shaft 23 may be varied by turning the knob 22 for balancing the force exerted by the spring 20.

An opening 30 is formed in the front of casing 10 for receiving the viewing means 32. The viewing means 32 comprises a viewing frame 36 having right and left hand openings 34 and 35 formed in the viewing frame for receiving suitable decentered convex lenses 38 and 39, respectively, which serve to focus on the test targets at desired optical test distances. The viewing frame 36 is pivotally mounted to the casing 10 by means of pins 40 and may be removed either as a unit for varying the optical system, or the lenses 38 and 39 may be individually supplemented by other lenses or removed and replaced with lenses of a different value or type for conducting various visual tests. Above the lens frame 36 there is provided a forehead rest 41 against which the observer places his head when taking a test and whereby the eyes are kept in spaced relation to the lens 38 and 39.

A drum member 42 is rotatably supported within the casing 10 on a suitably journalled shaft 44, which is positioned between the side wall members 48 and 50 of the casing. The drum member 42 is rotatable about an axis which is transversely located with respect to the side members and which is substantially perpendicular to them. The drum member 42 comprises a central circular disc member 52 supported by a hub 54 which, in turn, is connected to the shaft 44 by means of a key 45. Shaft 44, in turn, passes through the side walls 48 and 50 of the casing 10 and is retained in position by means of suitable bearing blocks 58 and 60, respectively. Lateral movement of the shaft 44 is prevented by means of a leaf spring 62 mounted on the bearing block 58 which urges the shaft toward bearing block 60. The terminal portion 64 of shaft 44 may be connected to a motor 66 (see FIGURE 4), which would be mounted inside the motor cavity 56 formed in the casing side wall 50, or alternatively, could be connected directly to a hand crank for manual operation. The opposite end 65 of shaft 44 is connected directly to a manual selector knob 68 which serves to both facilitate manual operation of the drum member 42 and to index the relative position of the drum in the casing 10.

The central circular disc member 52 is constructed to support a plurality of transparent target slides or test objects 46 of different types suitable for testing either far point and near point vision characteristics. Since the target slides employed for testing far point vision (an optical equivalent of approximately 20 feet) are entirely different than the type used for near point visual tests (an optical equivalent of approximately 14 inches), it is now possible to move each individual stereo slide through a related testing station in any desired sequence or combination regardless of its position on the drum by merely rotating the central circular disc 52 a predetermined amount. The transparent test objects 46 are carried by corresponding holders 70 which are equally spaced around the perimeter of the disc member 52. Each holder 70 includes a rectangular seat member 72 which defines a rectangular aperture 75 of a size to permit illumination of the test objects 46. Each slide 46 is of rectangular shape and is supported by the seat member 72. One side of seat member 72 has a substantially flat surface 73 on which the bottom longitudinal edge of a target slide 46 is seated while the adjoining side of the same seat member is provided with a flange 71 defining a channel under which an adjacent slide is engaged. The other bottom longitudinal edge of the slide abuts against a felt or rubber pad 69 secured to the rear inclined surface of flange 71. Test objects 46 are removably retained in mounted position by a suitable type of clamping means, such as an elastic retaining band 67 which extends around the periphery of drum 42 and engages the top surface of each slide. Suitable pins or end pieces 74 are provided on the holder 70 to contact the short sides of each test slide 46 and limit longitudinal movement of the same. The individual slide holders 70 are each secured to the centrally located circular disc 52 by means of a depending flange portion 76. In operation, the interchangeable stereo test slides 46 can be mounted in any sequence or removed from the holders 70 by passing the same through an opening 127 located at the rear of casing 10, which is normally closed by an access cover 128. It is assumed that each slide would have to be properly oriented by the operator regardless of the type of test being conducted.

An illuminating means in the form of separate pairs of electric lights 78, 79—80, 81 are mounted within the drum member 42. The electric lights are adjustably supported in the usual bulb receptacle 82 which is secured to an adapter plate 84 that may be inserted and removably retained in an access opening 86 formed in the side walls 48 and 50 of the casing 10.

A lens 91 is held by a retainer 92 over an opening 93 formed in the adapted plate 84 below the light source to visually indicate to the operator of the device when the light is illuminated and, consequently, when a selected set of test objects 46 are located in a related testing station.

The electric lights 78, 79—80, 81 are enclosed in separate pairs of right and left housings 88 and 89, respectively, which are defined by the side walls 48 and 50 of the casing 10. A window 90 is attached to each of the housings 88 and 89 in front of the light source and is formed of translucent material for equally diffusing the emitted illumination from the light source. The windows 90 are located directly behind the rectangular apertures 75 formed in the seat member 72 so as to uniformly frame and illuminate the test objects 46 when they are in viewing position.

Besides serving to frame the illuminated test objects, the separate pairs of housings 88 and 89 define a pair of test stations 94 and 96 for separately testing far point and near point vision characteristics, respectively. The far point vision test station 94 is located in elevated position with respect to the near point vision test station 96 and includes a pair of housings 88 and 89 each having a display opening or window 90 which extends transversely between the side wall of the casing and the central circular disc member 52, and which has an area similar to that of a single test object component.

The separate near point vision test station display openings of windows 90 defined by the second pair of housings 88 and 89 are positioned in alignment with the viewing means 32 carried at the front of the casing 10 so that any related near point test or target slide 46 aligned with these display openings may be directly observed; the plane of the slide before the display opening being substantially normal to the line of sight. On the other hand, the far point vision test station display openings, defined by the first pair of housings 88 and 89, are positioned in alignment with an optical reflector 98, preferably in the form of a mirror which, in turn, is visually aligned with the viewing means 32 so that the plane of any related test object or target slide 46 aligned with these openings will be substantially normal to the line of sight.

A suitable position-indicating dial 100, integrally associated with the selector knob 68, is employed to designate by the position of the dial 100 with respect to the visual-indicating lenses 91, not only when a slide or test object is located before the display openings at either test station, but also which one of the test objects is in position for observation.

For viewing the test objects, the pivotally mounted viewing frame 36 can be selectively positioned at an angle of about 15 degrees below the horizontal, which is approximately the normal line of sight, or at an angle of about 45° below the horizontal, by moving an operating handle 102 which will rotate the frame about pivot pins 40 into alignment with either far or near point test stations 94 and 96, respectively.

An upper, transversely extending divider member 27 is disposed between the viewing means 32 and the optical reflector 98, while a lower, transversely extending divider member 29 is positioned between the viewing means 32 and the near point test station 96. Both divider members 27 and 29 have a pair of openings 31 and 33 which are in alignment with lenses 38 and 39, respectively, and serve as separate apertures for defining the field of vision. To facilitate fusion of the stereogram target slides 46, a septum 25 extends upwardly from the lower divider member 29 for merging the test object components located at the far point test station 94.

It is to be noted that the optical means, 98, preferably in the form of an optical reflector, such as a mirror or prism, permits the far point target or test objects to be positioned physically closer to the viewing means without decreasing the optical distance. In this connection, it is obvious that since an optical reflector is employed to increase the visual distance between the far point test station and the viewing means, each of the far point test slides should be properly oriented by the operator for far point or near point vision, otherwise the target objects will appear to be optically inverted to the viewer. In addition, the angulated viewing path defined by the optical means 98 permits visual observation of any test stations located at different positions along the periphery of the drum. It should also be understood that the various test objects can be mounted on the rotating drum in any desired sequence or combination without departing from the scope of the present invention. The novel feature of employing an optical reflector to materially reduce the physical size of the casing, as well as to simplify both far point and near point testing by eliminating critical adjustments, also permits the use of a motor-driven drum which can be selectively rotated in either direction to change the relative position of each slide by merely closing an electrical switch.

An electric motor is provided to intermittently advance the drum 42 so as to successively position the various test objects 46 in alignment with visual test stations 94 and 96. For this purpose a relatively slow speed electric motor 66 is coupled either directly to shaft 44 or indirectly through conventional speed-reduction gearing for rotating the drum 52 as described hereinbefore. A plurality of equally spaced, arcuate detents 104 are circularly located along both sides of the circular disc member 52. The detents 104 are spaced an angular amount equal to the angular spacing of the various test object holders 70 positioned along the periphery of the drum 42.

Referring now to the schematic diagram illustrated in FIGURE 4 of the drawings, a pair of microswitches 106 and 108 are placed on opposite sides of the disc member 52. Each microswitch supports a roller or suitable follower 110 which is normally urged to engage an arcuate detent 104 when the drum 42 positions the test objects 46 in alignment with the visual test stations 94 and 96. Switch 106 is connected in series with the motor circuit and is normally opened when the detent 104 registers with the follower 110.

A manually operated push-button 115 actuates a pair of companion switches 112 and 117. Switch 112 is provided for automatically energizing and maintaining the motor 66 in operation while switch 117 interrupts the light circuit when push-button 115 is depressed. Switch 112 is placed in parallel with microswitch 106 so that when the motor 66 moves the disc 52, switch 106 will be closed to continue operation of the motor circuit until the follower 110 registers with the next successive detent 104, whereupon switch 106 will again be opened. Should the operator desire to continue rotation of the disc 52, he may close switch 112 until the selected test object 46 is correctly positioned in alignment with the related visual testing station.

The lights 78, 79—80, 81 are connected in parallel with the circuit of the motor 66. Connected in series with the light circuit is a normally closed microswitch 108 which is controlled by the above-mentioned detents 104 formed in the disc member 52. In addition, a selector switch 113 is connected in series with the control switch 108 for energizing either the far point vision lights 78, 79 or the near point vision lights 80, 81. A pair of interrupter switches 118 and 120 may be placed in series with lights 78 and 80, respectively, for separately interrupting illumination of the right test object component in both stations. A second pair of interrupter switches 122 and 124 are placed in series with lights 79 and 81, respectively, for interrupting illumination of either or both of the left test object components. It is to be noted that only the far point or the near point test lights may be illuminated at one time, depending upon the position of the selector switch 113. When the selector switch 113 engages the contact 114, lights 78 and 79 will be illuminated provided control switch 108 registers with one of the detents 104. In addition, either light 78 or 79 may be individually extinguished by opening the interrupter switches 118 or 122, respectively. Should the selector switch 113 be shifted to engage the contact 116, the near point vision lights 80 and 81 would be illuminated. In turn, either light 80 or 81 may be extinguished by opening the interrupter switches 120 or 124, respectively. Control switch 108 will normally permit illumination of the selected station when the motor 66 is not energized. However, when motor 66 is energized by depressing the push-button 115, the light circuit will be deenergized upon opening of the normally closed companion switch 117 which is in series with the control switch 108. In addition, when the motor 66 commences to rotate disc 52, control switch 108 will be opened and all illumination will be interrupted until the push-button 115 is released and the roller 110, connected to switch 108, registers with one of the successive detents 104. The interrupter switches 118, 120, 122, and 124, as well as a master switch 125, may be mounted in the switch box 126 positioned at the rear of the casing 10, while the selector switch 113 may be controlled by the hand lever 102 when it is selectively aligned with one of the test stations.

In operation, the casing 10 is elevated or depressed with respect to the base member 12 until the lenses 38 and 39 in the viewing frame 36 are opposite the eyes of the observer.

Assuming that the casing is adjusted for observation, the viewing means 32 is selectively positioned to conduct a far point visual test when the viewing frame 36 is aligned with the optical reflector 98. When the hand lever 102 is in this position, the selector switch 113 energizes the lights 78 and 79 which illuminate the far point vision station 94. The operator then depresses the push-button 115 to energize the motor 66 which advances the drum 42. Lights 78 and 79 will be temporarily extinguished until the push-button 115 is released and the control switch 108 registers with a detent 104; the selected far vision test object 46 will now be in alignment with the display openings or windows 90 defined by the housings 88 and 89. In this manner, each related test object 46 is selectively brought before the eyes of the observer by controlled rotation of the drum 42.

Figure 2:
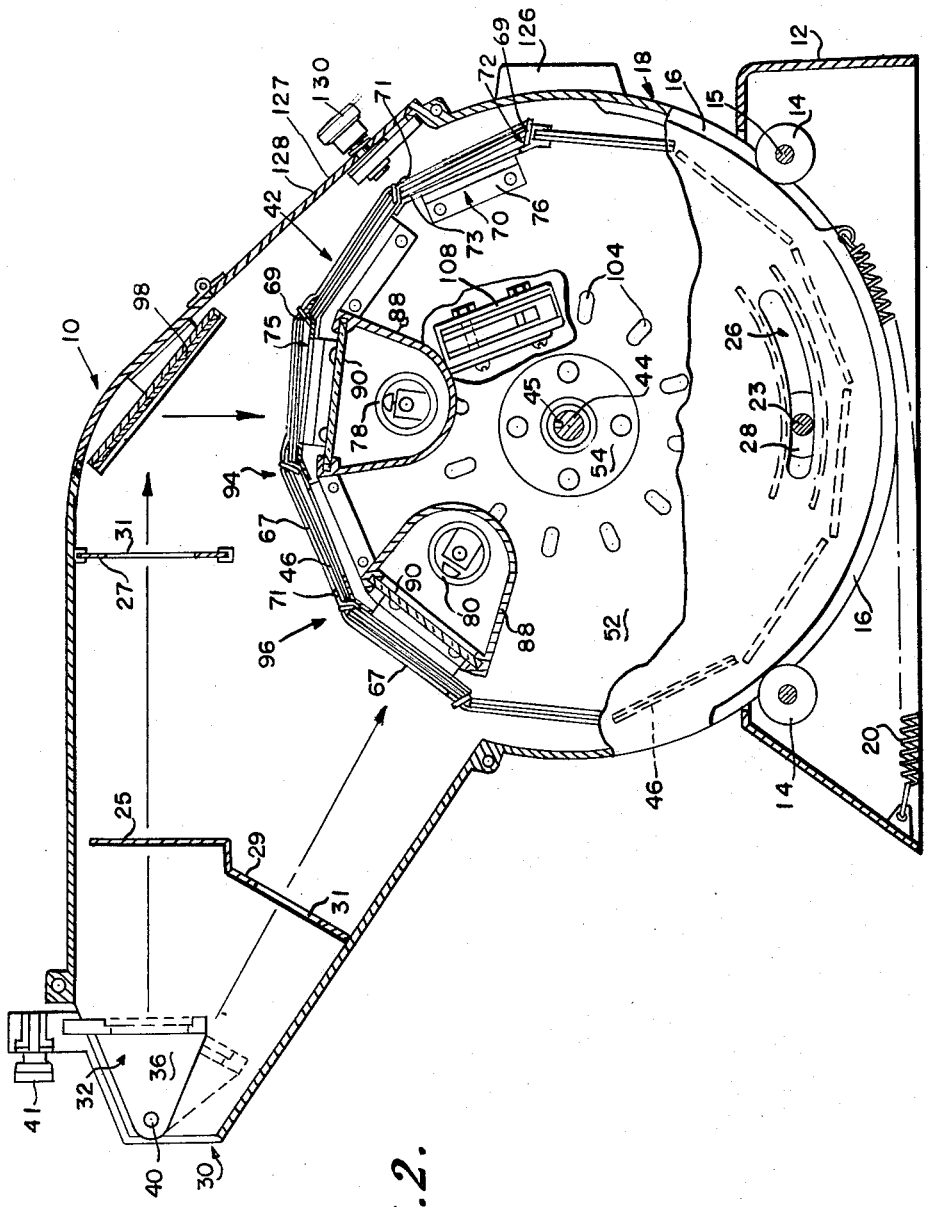
FIGURE 2 is a longitudinal sectional view of the device shown in FIGURE 1 and constructed in accordance with the present invention.
Figure 3:
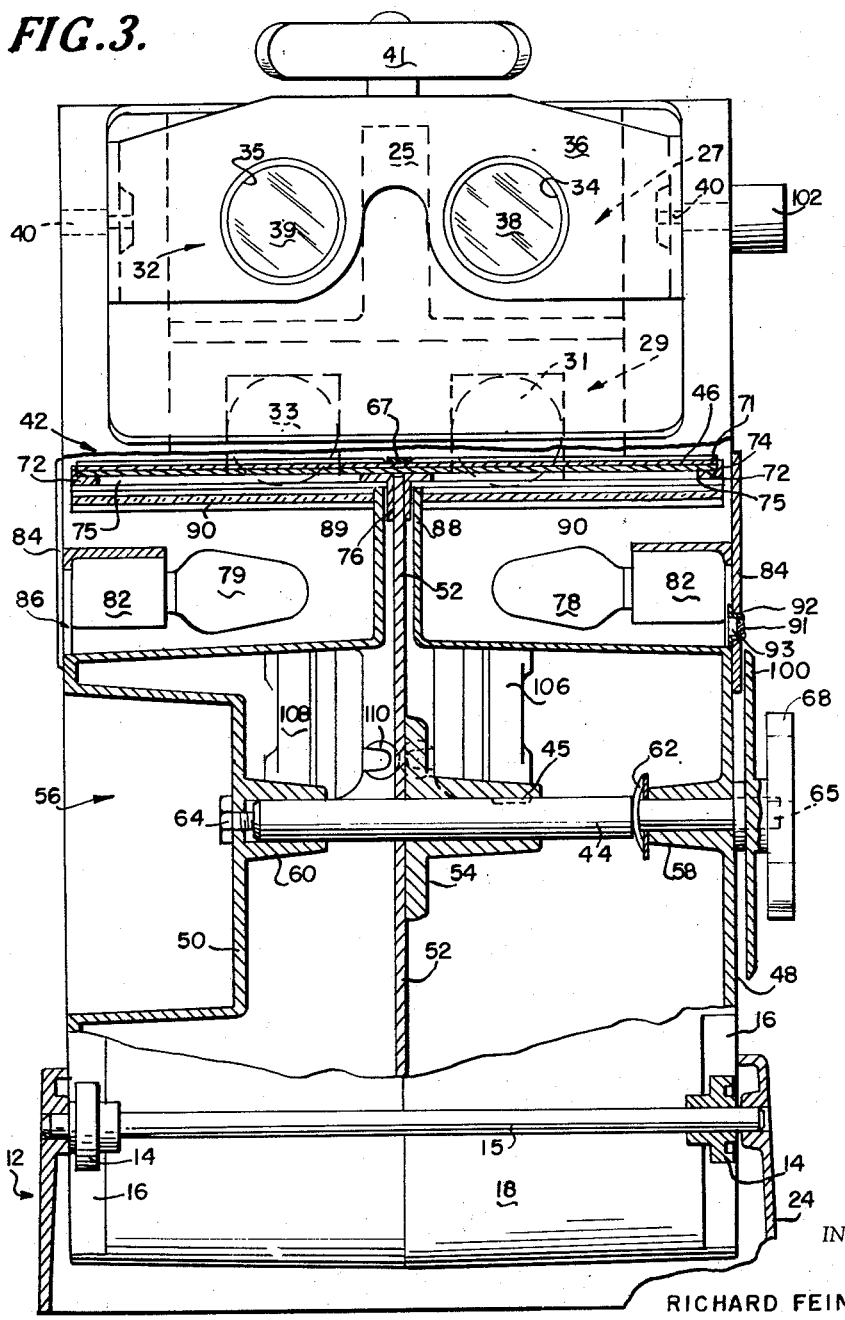
FIGURE 3 is a transverse sectional view shown partially in elevation of the apparatus shown in FIGURE 1.

In conducting a near point vision test, the vision frame 36 is moved about the pivot pin 40 into alignment with the test station 96 (as shown in phantom in FIGURE 2). When the hand lever 102 is depressed to this position, the selector switch 113 engages contact 116 and energizes lights 80 and 81 which illuminate the near point vision test station 96.

Although the physical distance between the frame 36 and the test stations 94 and 96 is substantially the same, the far point visual distance defined by the angulated viewing path exceeds the visual distance between the frame 36 and the near point vision test station 96. It should be pointed out that the visual test distances remain substantially constant for each observer thereby avoiding critical adjustments during the test. In addition, the conditions of illumination of the test objects will remain substantially constant regardless of the character of the surroundings of the room in which the device is operated, since extraneous light is occluded from the casing 10 which otherwise would affect illumination of the test objects. An observation aperture 77 is formed in the side wall 48 of the casing 10 above both the far point and near point vision test stations 94 and 92, permitting an operator to manually instruct and guide an observer during the test.

In conclusion, it is to be understood that, although a preferred embodiment of the present invention has been shown in the drawings and described with considerable particularity in the foregoing specifications, this invention is not limited to the specific details of construction shown and described, but includes all modifications coming within the scope of the appended claims and their equivalents.

We claim:

1. Vision testing apparatus of the type adapted to test both far and near vision characteristics comprising: a base, a light-occluding casing carried by said base, a single drum rotatably supported in said casing, means for rotating said drum, said drum having a far vision station and a near vision station disposed along separate portions of the drum periphery, a plurality of far point and near point test objects carried by said drum in position to be selectively moved into alignment with a related test station, viewing means carried by said casing including lens means adapted for optical alignment with said test objects located at either of said test stations, a reflector disposed intermediate said viewing means and said far vision station for defining an angulated visual path therebetween which substantially increases the visual distance between said viewing means and said far vision station while proportionately reducing the physical distance therebetween, said viewing means being selectively operated between a first position in alignment with said reflector for viewing far point test objects aligned with said far vision station and a second position for viewing said near point test objects aligned with said near vision station, said near vision station being disposed intermediate said viewing means and said far vision station.

2. Vision testing apparatus as set forth in claim 1 additionally including switching means for selectively illuminating each of said stations, and control means for interrupting illumination while said test objects are being moved from one position to another.

3. An apparatus according to claim 1 having means for illuminating said test objects including switching means for selectively illuminating each of said test stations, control means for interrupting illumination when said test objects are moved from one test station to another by said drum, said control means having interrupting means for extinguishing a portion of the illumination at each of said test stations to limit the field of vision to a single eye.

4. Vision testing apparatus as defined in claim 1 wherein means for rotating said drum includes an electric motor, and operating means electrically connected with the motor for selectively controlling the movement of said drum.

References Cited in the file of this patent

UNITED STATES PATENTS

| | | |
|---|---|---|
| 2,003,806 | Lee | June 4, 1935 |
| 2,147,957 | Ames | Feb. 21, 1939 |
| 2,180,652 | Wilson | Nov. 21, 1939 |
| 2,364,793 | Jobe et al. | Dec. 12, 1944 |
| 2,481,582 | Ellis | Sept. 13, 1949 |
| 2,485,272 | Freeman | Oct. 18, 1949 |
| 2,798,408 | Ellis et al. | July 9, 1957 |

FOREIGN PATENTS

| | | |
|---|---|---|
| 559,794 | Great Britain | Mar. 6, 1944 |